United States Patent [19]

Morasch et al.

[11] 4,056,137
[45] Nov. 1, 1977

[54] METHOD AND APPARATUS FOR CUTTING TENONS

[75] Inventors: Ronald J. Morasch; Robert J. Webb, both of Oshkosh, Wis.

[73] Assignee: Medalist Industries, Inc., Milwaukee, Wis.

[21] Appl. No.: 590,241

[22] Filed: June 25, 1975

[51] Int. Cl.² .............................................. B27F 1/08
[52] U.S. Cl. ........................................ 144/323; 74/112; 74/436; 83/274; 90/56 A; 144/2 R; 144/87; 144/134 R; 144/204; 144/309 R
[58] Field of Search ................... 83/273, 274; 74/112, 74/436; 90/56 A, 21 D; 408/70; 144/2 R, 134 R, 136 R, 137, 141, 198, 200, 201, 203, 204, 133 R, 309 R, 309 L, 321, 323, 85, 87

[56] References Cited

U.S. PATENT DOCUMENTS

| | | |
|---|---|---|
| 2,593,744 | 4/1952 | Gillespie .......................... 144/204 X |
| 2,607,375 | 8/1952 | Gillespie et al. ................. 144/141 X |
| 2,675,851 | 4/1954 | Mutti .................................. 83/274 X |
| 2,772,709 | 12/1956 | Foster ...................................... 144/87 |
| 2,893,450 | 7/1959 | Stouten et al. ........................ 144/87 |
| 3,779,294 | 12/1973 | Gillis ............................ 144/134 R X |

Primary Examiner—Othell M. Simpson
Assistant Examiner—W. D. Bray
Attorney, Agent, or Firm—Joseph P. House, Jr.

[57] ABSTRACT

Method and apparatus for cutting tenons in the ends of workpieces in which the workpiece is advanced on a rectilinear path, one or more cutting tools are reciprocated on a transverse rectilinear path which intersects the ends of the workpieces and the speed of advance of the workpieces and the speed of reciprocation of the cutting tools are varied so that the cutting tools have an effective undulating cutting path with respect to the workpieces, thus forming a series of spaced tenons thereon.

19 Claims, 9 Drawing Figures

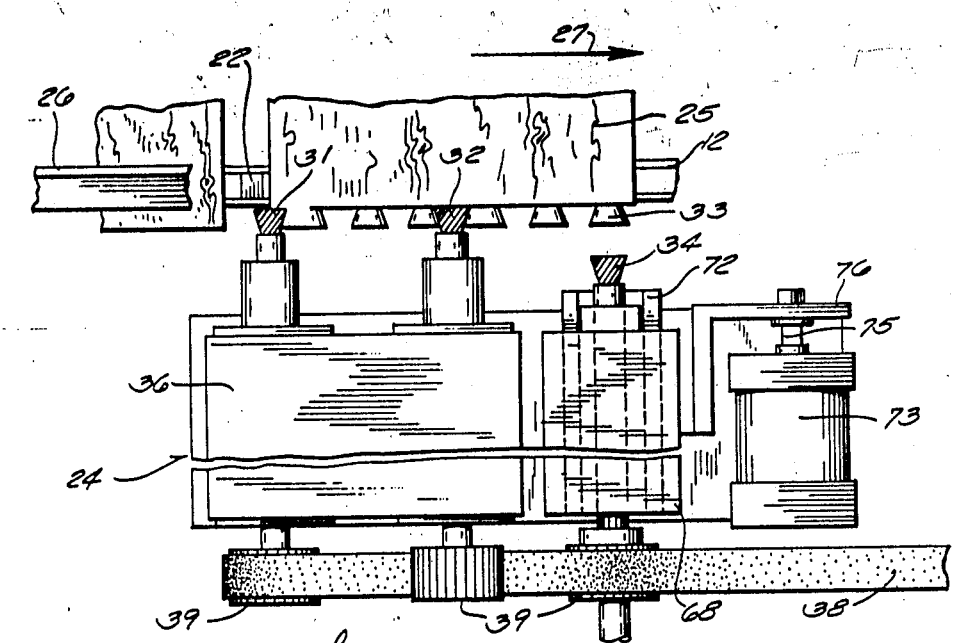
Fig. 3
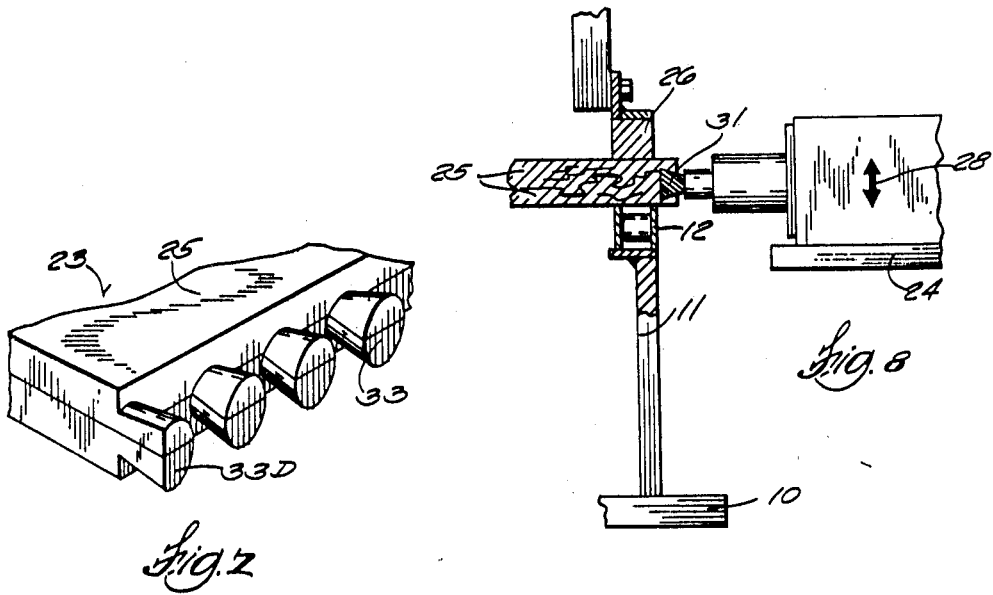
Fig. 2
Fig. 8

2

METHOD AND APPARATUS FOR CUTTING TENONS

BACKGROUND OF THE INVENTION

Heretofore, tenons such as male dovetails have been cut in the ends of workpieces such as the wooden boards which are used as drawer sides, by holding the workpiece stationary while a cutter head having many (15 for example) rotary dovetail cutter mills will gyrate in paths around the ends of the workpieces to produce the dovetails. The entire cutting head gyrates in the path which typically is in the shape of a figure 9. In such prior art machine, the cutter head typically weighs upward of 500 pounds and the mass, momentum and inertia of the heavy cutter head during its gyrating motion while forming the dovetails must be contained and controlled. This requires a substantial and heavy physical machine structure with corresponding increased expense.

SUMMARY OF THE INVENTION

An important object of the present invention is to reduce the weight of the cutting head, thus reducing the mass, momentum and inertia thereof so that the machine can be lighter in weight, simplified in construction and in which maintenance costs will be reduced.

This object is achieved by eliminating the need for gyrating the cutting head in a complex path. In accordance with the present invention, the cutting head has a simple rectilinear reciprocating motion.

Moreover, only two tenon forming tools need be incorporated in the cutting head of the present invention. This compares with a typical cutting head of the prior art in which fifteen tenon forming tools are required. This reduction in the number of tools greatly reduces the weight, mass, momentum and inertia of the cutting head and simplifies and cheapens its construction.

In order to achieve an effective path for the cutting tool which will cut the dovetail to its proper shape on the end of the workpiece, the present invention utilizes the composite motion of the rectilinear reciprocating cutting head, plus the movement of the workpiece on a transverse rectilinear path. Unlike the prior art, the workpiece is not stationary or held fast during the action of the cutting tool thereon. Both the workpiece and the cutting tool move concurrently or successively on transverse rectilinear paths and the composite or effective relative motion therebetween corresponds to the cutting tool moving on an undulating path with respect to the workpiece, thus forming a series of spaced tenons thereon.

To produce the desired configuration of the tenon the speed of the workpiece and the speed of the tool is varied. In the preferred embodiments of the invention, the speed of the workpiece and tool transport mechanism is varied in inverse relationship. The workpiece conveyor is actuated by a Geneva drive and the tool transport mechanism is actuated by a crank. The specific characteristics, sizes and dimensions of the Geneva drive and crank are selected to produce the undulating path for the tool which produces the desired configuration for the tenons.

Other objects, features and advantages of the invention will appear from the disclosure hereof.

DESCRIPTION OF THE DRAWINGS

FIG. 3 is a fragmentary plan view showing the cutting tools in the course of cutting tenons in the end of the workpiece.

FIG. 5 is a fragmentary perspective view of the ends of abutting workpieces with the workpieces separated to illustrate how two workpieces are handled together to concurrently form spaced tenons therein.

FIG. 6 is a diagrammatic view illustrating the effective undulating path of paired cutting mills to cut the tenons from the workpiece.

FIG. 7 illustrates workpieces in which tenons have been cut and in which there is an unwanted partial dovetail which will be removed by the third cutting mill of the present invention.

FIG. 8 is a fragmentary and elevational view of the apparatus shown in FIG. 1.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
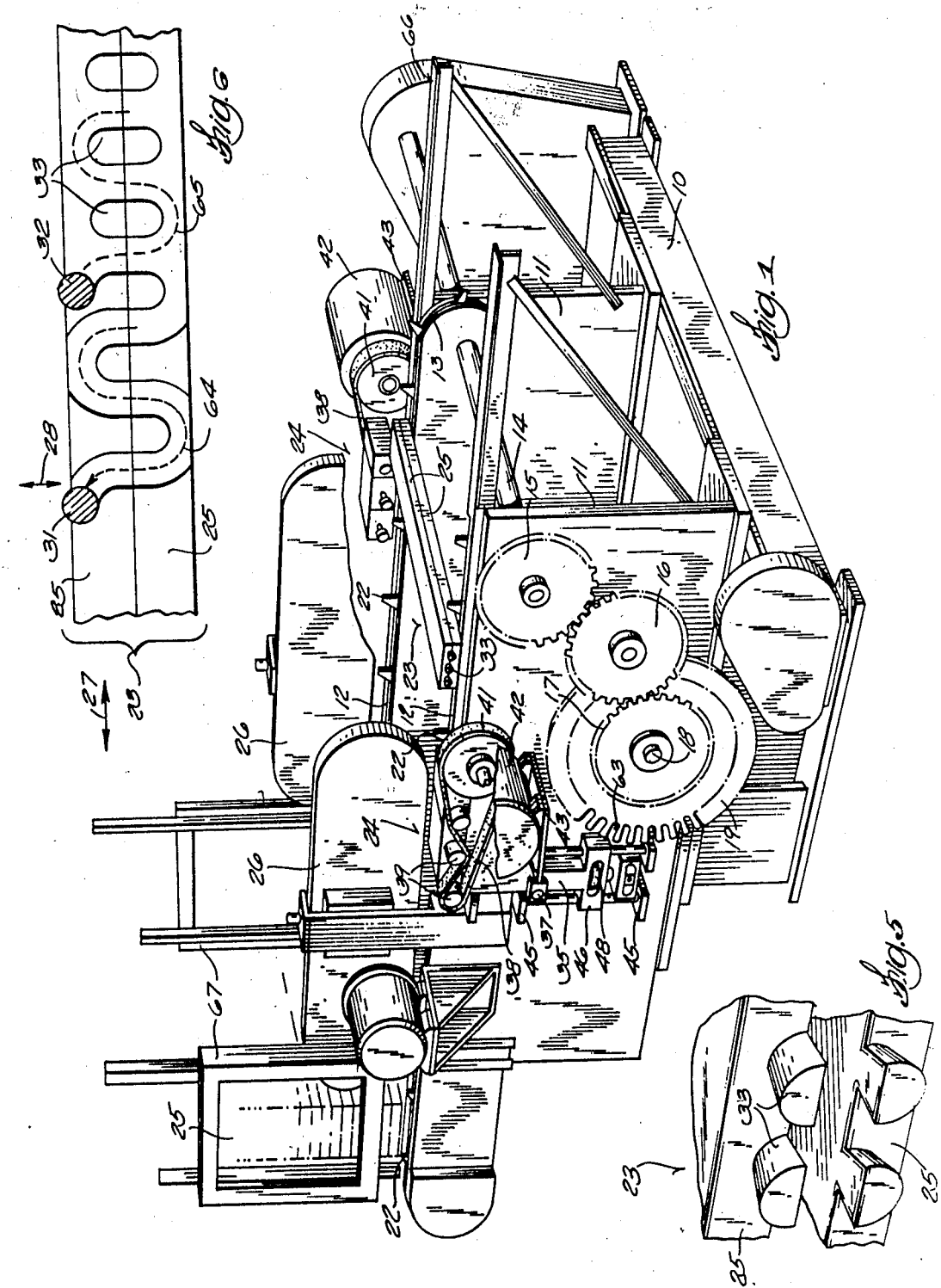
FIG. 1 is a perspective view of apparatus embodying the present invention.

FIG. 1 is an over-all view of apparatus embodying the present invention. The apparatus is supported on a frame 10 having upright support side frame members 11 which support operating parts of the apparatus. Dual laterally spaced conveyor chains 12 are mounted on the side frame members 11 on end sprockets 13 powered by a cross shaft 14. Shaft 14 may be provided with an end gear 15 which meshes with an intermediate gear 16 engaged with a drive gear 17 on shaft 18 of a Geneva wheel 19.

Chain conveyors 12 are provided with suitably spaced laterally aligned push lugs 22 which engage behind opposite ends of the workpiece 23 to advance the workpiece past the cutting heads 24. The workpiece 23 typically comprises two wooden boards 25, one on top of the other, held together under pressure of the overhanging belt conveyors 26. Conveyors 26 clamp the ends of the stacked boards 25 against the underlying chain conveyor 12. Boards 25 typically comprise drawer sides on which male dovetails or tenons 33 are to be formed.

Conveyor 12 moves the workpiece 23 on a rectilinear path which in the apparatus of FIG. 1 is horizontal. Both ends of the workpiece 23 extend laterally beyond the chain conveyor 12, as is illustrated in FIGS. 1, 3, 4 and 8. The horizontal path of the workpiece 23 is indicated by arrow 27 in FIG. 4.

Both sides of the apparatus are provided with cutting heads 24. Each cutting head 24 is caused to reciprocate on a rectilinear vertical path indicated by the doubleheaded arrow 28 in FIGS. 4 and 8. Cutting head path 28 is at a right angle to workpiece path 27.

In the illustrated embodiment, each cutting head 24 comprises dual tapered cutting mills 31, 32 which work together as hereinafter explained to cut tenons 33 from the ends of the boards 25 of the workpiece 23. Head 24 also comprises a separate cutting or clipping mill 34 which is normally in its retracted position shown in FIGS. 3 and 4 and the purpose of which will hereinafter be explained in more detail.

Each cutting head 24 is mounted for vertical reciprocation on path 28 on a vertically extending post 35. The respective cutting mills 31, 32 are each mounted on a single bearing block 36 of head 24. The drive shaft for each mill 31, 32 extends rearwardly from the bearing block 36 and is provided with pulleys 39 about which a drive belt 38 is reeved. Drive belt 38 is driven from the pulley 41 on motor 42 which is mounted on a bracket 43 which pivots on posts 37 (FIG. 1) which is mounted on the frame wall 11. Accordingly, the motor 42 pivots as dictated by the vertical reciprocation of the cutting head 24.

The post 35 and cutting head 24 are guided for vertical reciprocation on the vertically oriented guide rods 44 (FIG. 2) which are secured to the frame wall 11 by the brackets 45. For this purpose post 35 has laterally extending wings 46 with sleeve bearings 47 about the guide rods 44.

At its lower end, post 35 is connected to a bracket 29 which is also provided with sleeve bearings 47 slidable on posts 44. A threaded rod 30 extends through a bore 40 in bracket 29 and is mounted on a laterally elongated yoke 50 with a similarly laterally elongated slot 51 in which is received the slide block 52 of crankpin 53 which projects from the face of gear 54. Gear 54 rotates on jack shaft 55 which is mounted on the frame wall 11. Threaded rod 30 engages nut 48 captivated in socket 49 in block 29. Accordingly, by turning nut 48 the post 35 can be adjusted with respect to the yoke 50.

Gear 54 is driven by a drive gear 56 which rotates on a drive shaft 57 rotatably mounted on the frame wall 11. Gear 56 is provided with laterally projecting drive pins 62 which engage the teeth 63 of the Geneva wheel 19. Accordingly, as drive gear 56 is turned at a uniform speed, it will drive through the Geneva motion provided by the pins 62 and the Geneva wheel 19 to advance the conveyor chains 12 and the workpiece 23 intermittently and at varying rates of speed, depending upon the configuration of the Geneva motion components aforesaid.

At the same time, drive gear 56 will drive the gear 54 and the crankpin 53 thereon will lift and lower the post 35 and the cutting head 24 mounted thereon at varying rates of speed, depending upon the position of the crankpin 53 with respect to the slot 51 in yoke 50. In this manner, the workpiece 23 will be advanced on a rectilinear horizontal path intermittently at various rates of speed as produced by the Geneva motion aforesaid. Concurrently, the milling head 24 will reciprocate vertically on a rectilinear path at varying rates of speed determined by the crank ratio between crank 53 on gear 54 and the slotted yoke 50 on the post 35.

Figure 2:
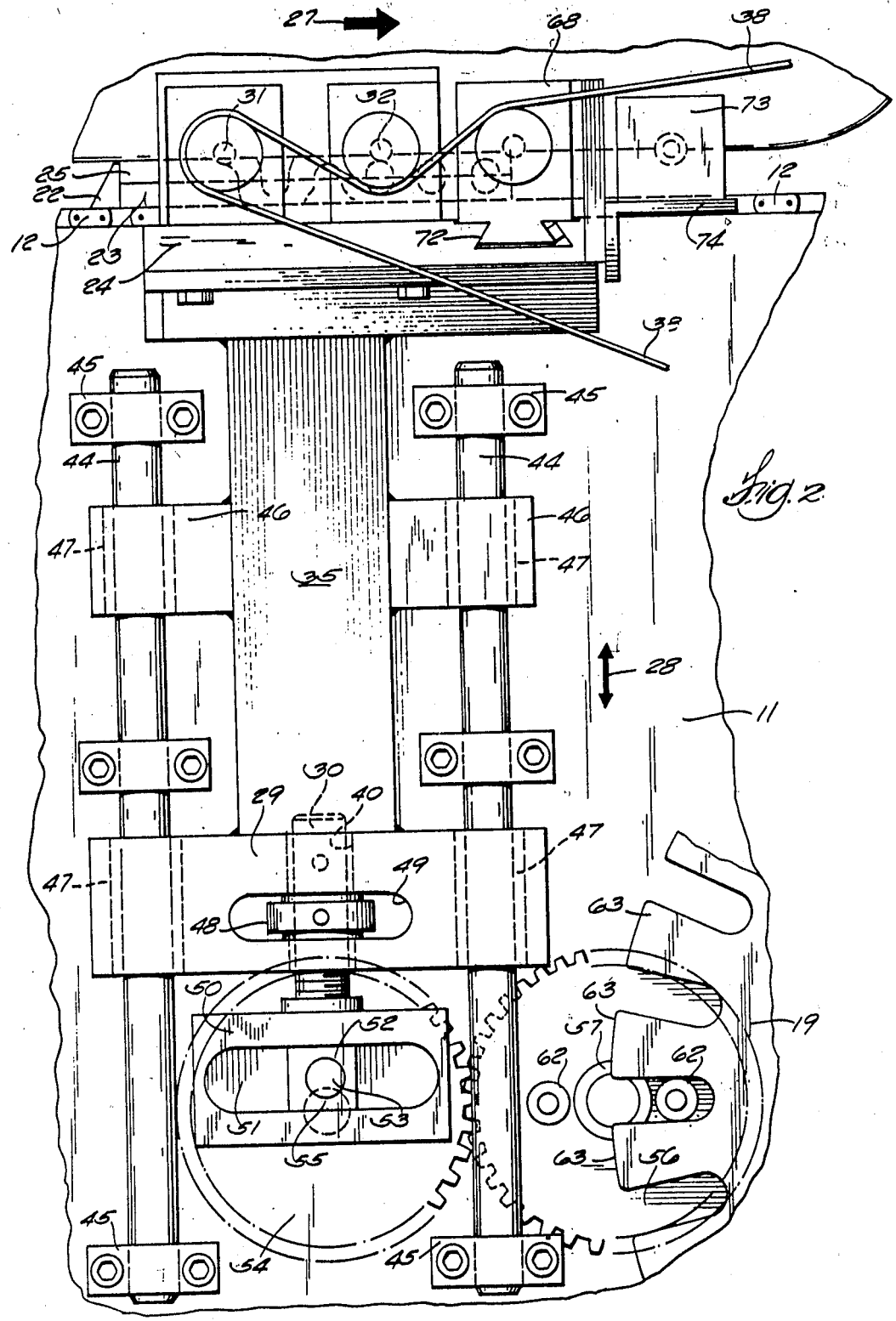
FIG. 2 is a fragmentary enlarged side elevation of a portion of the apparatus of FIG. 1 and showing the manner in which the Geneva wheel and the crank are driven by a common drive mechanism.

As is clear from FIG. 2, the conveyor 12 will have its maximum rate of speed in the position of the parts illustrated in FIG. 2. This is because the crankpin 62 on gear 56 which is engaged with a tooth wheel 19 is moving vertically. At the same time, the cutting head 24 will be at the top of its stroke and will have reached an end point in its vertical reciprocation. This is because crankpin 53 on gear 54 is moving horizontally. Thus it imparts no vertical motion to post 35.

When the drive gear 56 has rotated one-quarter of a turn, pins 62 will be moving horizontally. They impart no vertical motion to the Geneva wheel 19 and the Geneva wheel 19 and conveyor 12 driven thereby will have come to a stop. At this point in time the gear 54 and the crankpin 53 actuating the post 35 will have also moved one-quarter of a turn so that the crank 53 is near the end of slot 51 and is moving the cutting head 24 at maximum speed vertically. From the foregoing, it is clear that there is an inverse ratio between the speeds of the workpiece and the cutting head. When the workpiece is moving at maximum speed, the milling head will have stopped. When the conveyor is stopped, the cutting head 24 will be moving at maximum speed.

In between the two positions of the drive gear 56 just mentioned, the pins 62, 53 will impart motion to the Geneva wheel 19 and cutting head post 35 at intermediate inversely related speed rates, depending on the position of the parts.

Figure 4:
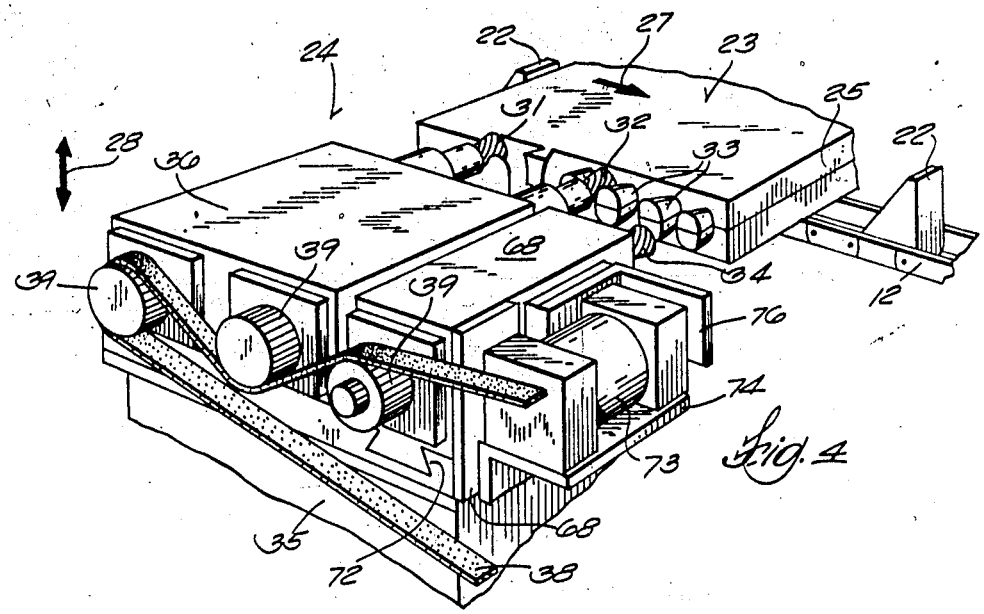
FIG. 4 is a perspective view illustrating the cutting tools in course of cutting tenons in the ends of the workpieces.

Even though both the workpiece 23 and the cutting head 24 are moving on the transversely related rectilinear paths 27, 28, the composite or result of this motion is for the cutting mills 31, 32 to have effective undulating paths indicated by the traces 64, 65 in FIG. 6. Traces 64, 65 have somewhat the shape of a sine wave curve. As the two mills 31, 32 move on their undulating paths 64, 65 aforesaid, they will mill out the ends of the workpiece boards 25 to leave dovetails or tenons 33 as indicated in FIGS. 2, 4 and 6. Because of the tapered configuration of the cutting mills 31, 32, the outer ends of the tenons 33 will be larger than their root portions which are nearest the boards 25.

Only two mills 31, 32 for each cutting head 24 are required to produce any number of tenons 33. This is because the continuous vertical reciprocation of cutting heads 24 will mill a substantially continuous series of tenons 33 on the ends of the boards 25 as the boards 25 are intermittently advanced on their horizontal path by the conveyor 12.

In the illustrated embodiment, cutting mills 31, 32 are spaced apart on three-inch centers, for cutting tenons 33 which typically are spaced on 1-inch centers. This provides ample room between mills 31, 32 to accommodate the bearing housing 36. This spacing is not critical, except for mechanical convenience, as the mills 31, 32 could be spaced apart on one, three or any odd whole number multiple of the tenon spacing. The odd whole number spacing is needed to produce two different paths 64 and 65, as explained in connection with FIGS. 6 and 9.

Figure 9:
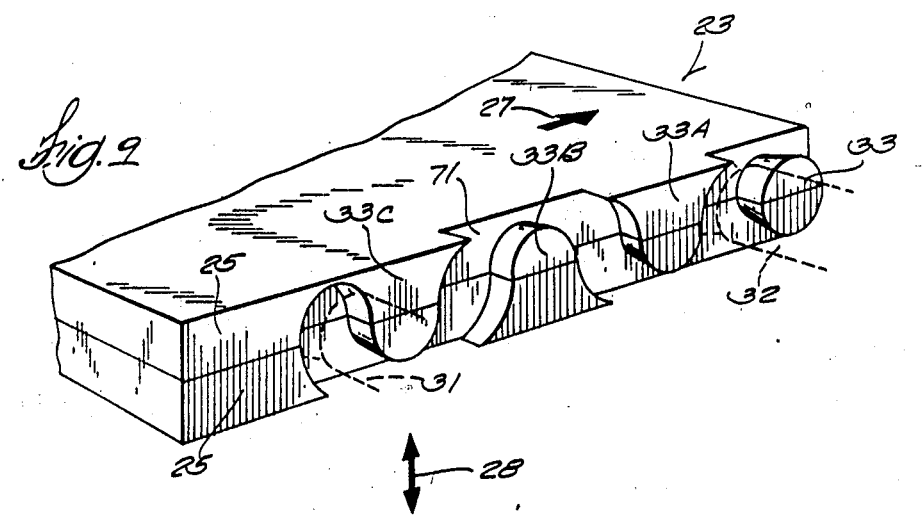
FIG. 9 is a fragmentary perspective view illustrating the cutting action of the cutting mills on the workpiece.

FIG. 9 illustrates how the two cutting mills 31, 32 coact to mill the tenons 33. The grooved path 71 in the ends of boards 25 has been milled by cutting mill 31. This groove 71 has fabricated incomplete tenons 33A, 33B and 33C. Mill 31 has finished the bottom halves of tenons 33A and 33C and the top half of tenon 33B. However, the top halves of tenons 33A and 33C and the bottom half of tenon 33B have not yet been cut. As the workpiece 23 continues its intermittent movement in the direction of arrow 27, mill 32 will cut the top halves of tenons 33A and 33C and the bottom half of tenon 33B. FIG. 9 illustrates how the tenon 33 at the extreme right of FIG. 9 has been completely cut, after action of both mills 31, 32.

As the workpieces 23 are finished, they will be discharged over the discharge platform 66 at the end of the machine. Fresh workpiece boards 25 are fed to the input end of the machine at the left of FIG. 1 in the vertical hopper frames 67. The lugs 22 on the chains 12 will strip off two boards 25 from the bottom of the hopper 67 as the chains travel in the direction of arrow 27.

FIG. 7 illustrates a situation in which an unwanted tenon 33D is produced on the workpiece 23. Unwanted tenons 33D usually result from the fact that the machine automatically fabricates tenons on 1-inch centers without regard to the dimension of the workpiece 23 in the direction of arrow 27. Accordingly, as illustrated in FIG. 7, tenon 33D may be incomplete and be located at the edge of the workpiece. For the removal of this unwanted tenon 33D, each milling head 24 is provided with an auxiliary cutting or clipping mill 34 as hereinbefore described. Mill 34 and its drive mechanism in housing 68 is mounted on a dovetailed slide 72 on cutting head 24 on which housing 68 is movable toward and away from the ends of the workpiece boards 25. As illustrated in FIGS. 3 and 4, the auxiliary cutter 34 is normally retracted. Accordingly, the normal cutting action of the mills 31, 32 is not affected by the presence of the auxiliary mill 34.

Auxiliary or clipping mill 34 is spaced in the direction of arrow 27 from mill 32 a distance such that if the mill 34 is advanced, it will engage tenon 33, rather than fall into the space therebetween. In the illustrated embodiment, clipping mill 34 is spaced two and one-half inches from cutting mill 32. To remove unwanted tenon 33D, an air cylinder 73 is actuated just before unwanted tenon 33D comes opposite mill 34, thus to advance the drive mechanism housing 68 and clipping mill 34 on its slide support 72. Accordingly, upon vertical movement of the head 24 the unwanted tenon 33D will intersect mill 34 and be milled away and eliminated from the workpiece. Thereupon, the clipping mill 34 is immediately retracted by air cylinder 73 to its position shown in FIGS. 3 and 4, so that it will not remove wanted tenons 33 and pending need for its renewed use. As best shown in FIGS. 2, 3 and 4, air cylinder 73 is mounted on a bracket 74 and has its piston rod 74 connected to the drive housing 68 of mill 34 by bracket 76.

What is claimed is:

1. A method of cutting tenons in the ends of workpieces and comprising the steps of advancing the workpiece on a substantially rectilinear path, reciprocating a cutting tool on a transverse, substantially rectilinear path which intersects the workpiece for a distance inwardly of its edge equal to the length of a tenon and concurrently varying the speed of advance of the workpiece and the speed of reciprocation of the cutting tool so that the cutting tool has an effective undulating cutting path with respect to the workpiece which is a composite of the variation in workpiece speed and cutting tool speed, thus forming a series of spaced tenons thereon.

2. The method of claim 1 in which the speed of advance of the workpiece and speed of reciprocation of the cutting tool are inversely related.

3. The method of claim 1 in which the advance of the workpiece is produced by a Geneva motion.

4. The method of claim 1 in which the reciprocation of the cutting tool is produced by a crank motion.

5. The method of claim 1 in which a second cutting tool spaced from the first-mentioned cutting tool in the direction of the workpiece movement a distance equal to a whole number multiple of the tenon spacing is concurrently reciprocated on a path parallel to the path of the first-mentioned cutting tool.

6. The method of claim 5 in which a third cutting tool spaced from the second cutting tool in the direction of workpiece advance a distance sufficient to intersect an unwanted tenon is selectively disposed in a path parallel to the path of said first and second cutting tools and is concurrently reciprocated on said path to cut off said unwanted tenon.

7. The method of claim 1 in which said cutting tool comprises a rotary mill which is rotated on its own axis concurrently with reciprocating it on its rectilinear path.

8. The method of claim 5 in which the said first and second cutting tools mill opposite tops and bottoms of the same tenon.

9. Apparatus for cutting a series of tenons on the edge of a workpiece and comprising a conveyor for advancing the workpiece on a substantially rectilinear path, a cutting tool and tool transport mechanism for reciprocating said tool on a transverse substantially rectilinear path which intersects the workpiece for a distance inwardly of its edge equal to the length of a tenon, and means for concurrently varying the speed of said conveyor and said tool transport mechanism so that the cutting tool has an effective undulating cutting path with respect to the workpiece which is a composite of the variation in workpiece speed and cutting tool speed, thus forming a series of spaced tenons thereon.

10. The apparatus of claim 9 in which said means comprises means for varying the speed of said conveyor and the speed of said tool transport mechanism in inverse relation.

11. The apparatus of claim 9 in which said means comprises a Geneva drive wheel for said conveyor.

12. The apparatus of claim 9 in which said means comprises a crank for said tool transport mechanism.

13. The apparatus of claim 9 in which said means comprises a Geneva drive wheel for said conveyor and a crank for said tool transport mechanism, and a common drive for said Geneva wheel and said crank.

14. The apparatus of claim 13 in which said crank comprises a gear wheel with a crankpin, said common drive comprising a gear wheel in mesh with the crank gear and having projecting Geneva drive pins engageable with teeth on the Geneva drive wheel.

15. The apparatus of claim 9 in which said cutting tool comprises two spaced rotary cutting mills which together mill the workpiece completely around each tenon.

16. The apparatus of claim 15 in which said tool transport mechanism comprises a power head from which said cutting mills project transversely to both said rectilinear paths.

17. The apparatus of claim 15 in which said cutting mills are spaced apart in the direction of workpiece movement a distance equal to a whole number multiple of the spacing between adjacent tenons.

18. The apparatus of claim 15 in which said cutting tool further comprises a clipping mill and means to selectively advance and retract said mill with respect to the end of the workpiece to mill off unwanted tenons.

19. The apparatus of claim 18 in which said clipping mill is spaced from an adjacent cutting mill a distance sufficient to intersect said unwanted tenon.

* * * * *